Patented May 31, 1938

2,118,925

UNITED STATES PATENT OFFICE 2,118,925

DIPENTENE-MALEIC ANHYDRIDE REACTION PRODUCT AND PROCESS OF MAKING IT

Irvin W. Humphrey, Wilmington, Del., assignor to Hercules Powder Company, Wilmington, Del., a corporation of Delaware No Drawing. Application December 8, 1934, Serial No. 756,703

9 Claims. (Cl. 260—123)

This invention relates to a new resinous composition and to a method for its production.

Heretofore, as is shown, for example, in the British Patent No. 300,130, of 1928, to Diels and Alder, it has been known to react maleic anhydride, or equivalently maleic acid, with certain hydroaromatic hydrocarbons, as for example, phellandrene, the reaction products being crystalline compounds.

Now, in accordance with this invention, it has been found that a new resinous composition is produced by reacting maleic anhydride, or equivalently maleic acid, or fumaric acid, with dipentene, or with a turpentine cut, preferably a wood turpentine cut, boiling within about the range 170° C.–178° C. and which may be obtained by fractionation of crude turpentine from the *Pinus palustris*. The cut will comprise largely dipentene, though it will also contain small amounts of other terpenes.

The composition in accordance with this invention differs essentially from the compositions of Diels and Alder in that it is amorphous and will retain its amorphous state under conditions which in general induce crystallization, hence lending itself for various uses and among others for uses for which compositions having crystalline structure are not adapted.

The resinous composition in accordance with this invention, as has been indicated, is the result of the reaction of maleic anhydride, or maleic acid, or fumaric acid, with a turpentine cut boiling within about the range 170° C.–178° C. or more specifically with dipentene.

The resinous composition is a light yellow fairly soft amorphous solid at room temperature and will be found to possess high stability. The resinous composition is adaptable for various uses and, for example, will be found to be an efficient thermoplastic material. Further, it may be reacted with monohydric alcohols to form esters, valuable for use in coating compositions, and with polyhydric alcohols to form "alkyd resins", which may be used as plastics or modified with natural resins, fatty acids, vegetable oils, etc. for use in coating compositions of all types with various ingredients of which they will variously be compatible, such as lacquer and varnish ingredients, as nitrocellulose, drying oils, etc.

As has been indicated, the resinous composition may be prepared in accordance with the method embodying this invention by reacting a turpentine cut boiling within about the range 170° C. to 178° C. and comprising dipentene and small amounts of other terpenes, and, more specifically, by reacting dipentene with maleic anhydride.

If desired, in carrying out the reaction described, a catalyst, as, for example, para-toluene sulphonic acid, sulphuric acid, aluminum chloride, zinc chloride, or other known catalytic material, may be used. When a catalyst is used the effect will largely be in the production of a somewhat softer product.

In the practical adaptation of this invention the reagents may be reacted in widely varying proportions, though usually it will be desirable to employ at least sufficient turpentine cut or dipentene to combine with all of the maleic anhydride employed. Maleic acid or fumaric acid in equivalent proportion will be equivalent to maleic anhydride, since, as is well known, maleic acid and fumaric acid will be converted into maleic anhydride on heating and the isomers of dipentene, d-limonene and l-limonene will be equivalent to the turpentine cut indicated and to dipentene.

As illustrative of the practical adaptation of this invention, for the production of the resinous composition, for example, an excess of the turpentine cut indicated, or dipentene, say 200 g. is heated with say 100 g. of maleic anhydride or alternatively with an equivalent quantity of maleic acid, or fumaric acid, at a temperature of say about 175° C. to 200° C. for a period of about three to five hours. If desired the reaction may be carried out under superatmospheric pressure.

On completion of the heating period unreacted turpentine cut or dipentene, unreacted maleic anhydride and impurities insofar as such may be present, are removed by applying a vacuum, of say about 15 millimeters of mercury, while maintaining a temperature under which the unreacted reagents and impurities will distill off without distillation of the reaction products. The product is then cooled. On cooling to room temperature the composition will solidify into a soft, light yellow gum in amount representing a yield of about 150 grams of resinous product. In the above examples the time of reaction will be reduced by carrying out the reaction under pressure and at a higher temperature. For example, the reaction may be carried out under a pressure of about 75–100 pounds and at a temperature of about 200° C.–225° C.

As illustrative of the procedure when pure dipentene is used the following example is given: 41 parts of dipentene having a boiling point of 175° C.–176.5° C. at 755 mm., a refractive index at 20° C. of 1.4722, and a density at 20° C. of 0.8511 were refluxed for three hours with 20 parts of maleic anhydride. After the reaction was completed the product was steam distilled so as to remove the excess terpene. After separation the high boiling residue from the steam distillation was dried by dissolving it in ether and treating it with anhydrous sodium sulfate. The resulting product was then dehydrated by heating it to 100° C.-105° C. in an open dish. The yield was 97%-98% based on the maleic anhydride.

It will be noted that on the completion of the reaction the reaction product is recovered directly by the removal of excess of unreacted reagents and such impurities as may be present, it being unnecessary to subject the product to any further purification treatment.

It will be appreciated that the procedure, temperature, time, etc. described in connection with the carrying out of this method is for the purpose of illustration only and that variation thereof is contemplated as within the scope of the invention.

What I claim and desire to protect by Letters Patent is:

1. As a new resinous composition the product of the reaction of maleic anhydride and dipentene.

2. The method of producing a new resinous composition which includes reacting maleic anhydride and dipentene.

3. The method of producing a new resinous composition which includes reacting maleic anhydride and dipentene in the presence of heat.

4. The method of producing a new resinous composition which includes reacting maleic anhydride and dipentene in the presence of heat and a condensation catalyst.

5. The method of producing a new resinous composition which includes reacting maleic anhydride and an excess of dipentene, distilling off excess dipentene and cooling the product.

6. The method of producing a new resinous composition which includes reacting maleic anhydride and dipentene at a temperature of from about 175° C. to about 225° C.

7. The method of producing a new resinous composition which includes reacting about two parts by weight of dipentene to about one part by weight of maleic anhydride at a temperature of from about 175° C. to about 225° C.

8. The method of producing a new resinous composition which includes reacting maleic acid and dipentene in the presence of heat.

9. The method of producing a new resinous composition which includes reacting maleic anhydride and dipentene in the presence of heat and under a pressure of about 75 to about 100 pounds per square inch.

IRVIN W. HUMPHREY.